Nov. 27, 1951 J. J. DONKELAAR ET AL 2,576,785

CROSSBAR SWITCH FOR AUTOMATIC TELEPHONE INSTALLATIONS

Filed Feb. 12, 1949 2 SHEETS—SHEET 1

INVENTORS.
JACOBUS JOHANNES DONKELAAR
GUNNAR BORGE KNOS.
BY Fred M Vogel
AGENT.

Nov. 27, 1951 J. J. DONKELAAR ET AL 2,576,785

CROSSBAR SWITCH FOR AUTOMATIC TELEPHONE INSTALLATIONS

Filed Feb. 12, 1949 2 SHEETS—SHEET 2

INVENTORS.
JACOBUS JOHANNES DONKELAAR
GUNNAR BORGE KNOS.
BY
Fred M Vogel
AGENT.

Patented Nov. 27, 1951 2,576,785

UNITED STATES PATENT OFFICE 2,576,785

CROSSBAR SWITCH FOR AUTOMATIC TELEPHONE INSTALLATIONS

Jacobus Johannes Donkelaar and Gunnar Börge Knös, Eindhoven, Netherlands, assignors to Hartford National Bank and Trust Company, Hartford, Conn., as trustee Application February 12, 1949, Serial No. 76,084
In the Netherlands March 5, 1948

4 Claims. (Cl. 179—27.54)

Figure 3:
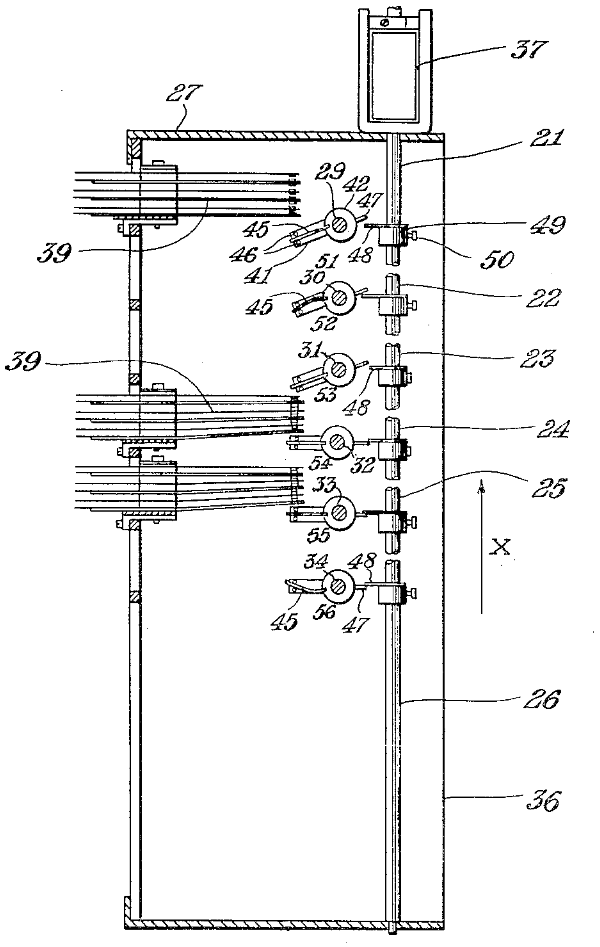

This invention relates to cross-bar switches for automatic telephone installations. Such a switch comprises a complex of groups of elementary switches arranged at the intersections of two series of parallel lines. The directions of the parallel lines will be distinguished as direction X and direction Y. The number of elementary switches of each group is at least equal to the number of wires constituting the channel of a telephone communication. All the elementary switches of one group are opened or closed simultaneously.

Each elementary switch comprises a fixed contact body and a movable contact body. As a rule, the fixed contact bodies of corresponding elementary switches of each series in one direction and the movable contact bodies of corresponding elementary switches of each series in the other direction are interconnected and connected to a supply wire, so that there are two bundles of supply wires comprising the incoming lines and the outgoing lines respectively. The incoming lines are connected, for example, to the apparatus of the subscribers and the outgoing lines to other apparatus (selectors, registers, etc.) associated with the telephone exchange. A plurality of groups of elementary switches may be closed at the same time, but the arrangement including the cross-bar switch is such that two or more connections with the same line cannot be established at one time.

Electromagnets are provided for the operation of the switches. All the groups of elementary switches of one series extending in direction Y are operated by the same magnet. The movable contact bodies of the elementary switches are moved by means of catches which are sometimes called ladders if their shape gives rise thereto. One catch is provided for each group. The catches in their turn are moved by a moving member connected to the armature of the common electromagnet. This moving member, similarly to the catch, may occupy either a passive or an active position.

A block comprising a series of groups operated by a common electromagnet (bridge magnet), the associated catches and the magnet with moving member is referred to as the bridge. The active and passive positions of a catch are to be understood to mean the positions at which the elementary switches of its group are closed and open respectively. The active position of the moving member is the position into which this member is moved upon closure of the elementary switches and the passive position thereof is the position into which it must be moved to permit the elementary switches of being opened.

It is dependent on the position of a further movable member, referred to as a bar, whether the movement of the moving member of the bridge is transferred or not transferred to the catches. All the catches of one series extending in the direction X co-operate with the same bar. In certain cases one bar is provided for every two such series. As a rule, the bar is an elongated body extending throughout the length of the cross-bar switch in direction X. The bars are likewise moved by electromagnets, one such magnet (bar magnet) being associated with each series of catches in direction X. A position of the bar at which the movement of the moving member of the bridge is transmitted to the catch is called active position and the position at which such is not the case is called passive position. In cross-bar switches of the type in which one bar co-operates with two series of catches extending in direction X, the bar occupies either of two active positions, which positions are to be regarded as active with respect to one series and the other respectively, or a third position which is passive with respect to the two series.

As a rule, the groups of one series in direction Y (bridge) are associated with a common incoming line and the groups of one series in direction X (bar) are associated with a common outgoing line, but the reverse may alternatively be the case.

The cross-bar switch may also be used for direct interconnection of two incoming lines. Such is the case, for example, if it serves for interconnection of two other cross-bar switches. As a rule, in this case a bundle of supply wires is connected only to the series in the direction X or Y, the conductors interconnecting the groups in the other direction serving as connecting wires.

A communication is established by co-operation of two magnets, a bridge magnet and a bar magnet. As a rule, the latter is required to be energized for a short time only.

The present invention relates to a crossbar switch the operation of which requires an amount of energy materially smaller than that of the crossbar switches hitherto known, since in contradistinction thereto the bridge magnets of the crossbar switch according to the invention need not remain energized for the whole duration of the communication. The switch according to the invention is realized in such manner that a communication established by short-period energisation of a bar magnet and a bridge magnet is maintained until either of the two magnets is again energized for a short time.

The crossbar switch according to the invention may be constructed in such manner that energisation of the bridge magnet has the effect of interrupting a connection (first method). As an alternative, the crossbar switch may be realized in such manner that the bar magnet instead of the bridge magnet requires to be energized for interruption of a connection (second method).

In either case short-period energisation only is required for completing and interrupting a connection. Consequently, the invention affords the advantage that the amount of energy required for operating the switch is much smaller than that required for the conventional crossbar switches.

This is of importance more particularly for small telephone exchanges which are supplied with electrical energy from elsewhere. In this case, a core of the telephone cable is sometimes used for the supply, but it is evident that this allows of only a limited power. The invention permits the use of this method of supply on a larger scale.

Furthermore, magnets which require to be energized for a period which is short in relation to the average duration of a telephone call may have dimensions smaller than those of magnets the current of which must continuously remain switched-on during the call, since a quicker rise in temperature is permissible with a shorter duration of the load.

The invention is further elaborated for both the abovementioned possibilities of construction. When using the firstmentioned method, it has been found that a suitable form of construction ensues if the moving member of the bridge is moved into its active position by spring force and into its passive position by the bridge magnet. In the crossbar switches hitherto known the reverse was the case. Since the spring force, as will appear hereinafter, in this case serves to close the switches, it will be referred to as closing force.

In order to maintain the catches in their passive positions, it is not required for the bridge magnet to be energized continuously, since this is ensured by a second spring force which will be referred to as directional force. Such is also the case with the crossbar switches of known type, in which the bridge magnet has to provide a force which surmounts the directional force. In the crossbar switch according to the invention as constructed by the first-mentioned method, the bridge magnet serves to store closing energy in form of spring energy. This spring energy is released when the bridge magnet is deenergised and may then serve to close a group of elementary switches. This takes place only if, on the bridge magnet being energized, the bar associated with the group concerned has been moved into its active position. For this purpose the bar magnet co-operating with this bar requires to be energized, which results in the moving member of the bridge being coupled with the catch of the group of elementary switches by means of a coupling member moved by the bar.

If, now, the current energizing the bar magnet is also interrupted so that the bar returns to its passive position, the coupling member is detained by the moving member and the group of switches still remains closed. It is not until, while the bar remains in its passive position, the bridge magnet is re-energized and moves the moving member into its passive position (against the closing force) that the catch is also permitted to occupy its passive position, the coupling member then being released. Consequently, the energisation of the bridge magnet need be only of short duration. When it ceases again, the closing force moves the moving member back into its active position. However, the catch does not then follow this movement since the coupling between the catch and the moving member has in the meantime been eliminated.

The coupling member may comprise a pin secured to the catch in a resilient and hence movable manner. When the bar is shifted towards its active position, it moves the pin into the path to be covered by the moving member of the bridge. Upon de-energisation of the bridge magnet, the pin is moved by the moving member, by the action of the closing force, in the closing direction of the group of elementary switches. In this direction, however, the pin is not movable with respect to the catch so that upon this movement the catch is also displaced and the group of switches closed.

The pin may be provided in a slot of the catch, which substantially extends in the direction X, and is adapted to be moved in this slot, hence in direction X, by means of a bar (pull bar) which is movable in its longitudinal direction. In another case the pin is moved by a bar (rotary bar) which is rotatable about its longitudinal axis. This method is used more particularly if a bar co-operates with two series of catches, in which event it is simpler if the pin is movable in a direction normal to the longitudinal direction of the bar.

In a crossbar switch according to the invention of the kind constructed by the second method, the moving member of the bridge, as has been common practice hitherto, is moved into its active position by energisation of the bridge magnet, a blocking member being secured to the bar to prevent movement of the catch if the bar occuplies its passive position. Consequently, the moving member of the bridge can only move the catch for closing or for opening the group of elementary switches if the bar occupies its active position, that is to say if the associated bar magnet is energised.

In this case it must be ensured that the bar does not also block the moving member itself, since otherwise for closing a group of elementaray switches, all bars were to be moved into their active positions and all groups of the bridge would be closed simultaneously. This requirement may be satisfied by coupling the catches to the moving member by means of a resilient connection which is sufficiently slack to avoid the movement of the moving member from being hindered despite the blocking of the catches. However, the resilient connection must be of sufficient rigidity to transmit this movement, when a catch is not blocked, to the catch and to the group of elementary switches to be operated thereby.

In one particularly suitable form of crossbar switch according to the invention of the kind constructed by the second method, the bars as well as the moving members of the bridges are rotary shafts, the bars extending in direction X and the bridge shafts in direction Y.

The catches are in this case rotatable about the bridge shafts but coupled therewith by means of the resilient connection. Each catch comprises an abutment which co-operates with a cam provided on the bar.

When the bar occupies its passive position, the cam is located in the path to be covered by the abutment, that is to say at one side of the abutment or at the other, according as the catch occupies its active or its passive position.

However, when a bar has been moved into its active position by energisation of the bar magnet, its cams are turned away and the abutments of the catches are enabled to pass. That catch which is provided on a bridge shaft of which the bridge magnet is energised and which co-operates with a bar of which the bar magnet is energised, thus assumes its active position and closes its group of elementary switches.

When the bar magnet and the bridge magnet are successively de-energised, the moving member of the bridge (the bridge shaft) returns to its passive position, but the group of switches remains closed. It is not until the bar magnet is re-energised that the resilient connection between the bridge shaft and the catch moves the latter back into its passive position, the group of elementary switches thus being opened. Immediately thereafter the current energising the bar magnet may again be interrupted.

It has previously been suggested for the conventional cross-bar switches, the bar magnets of which only require short-time energisation, that these magnets should be realised as selecting magnets. Such magnets, instead of themselves moving the bars, couple the bars to a central energy source which is realised in form of a moving-magnet. The selecting magnets need perform only little work as compared with the magnet which serves to move the bar, so that they may be of a smaller size. This system could not be used so easily with the bridges since here the magnets must remain operative for the whole duration of the call.

In the cross-bar switch according to the invention use may be made for the bars and for the bridges, in the same simple manner as previously for the bars only, of a central source of energy in conjunction with a number of small selecting magnets. This central source of energy may be an electromagnet, but a continuously-rotating motor may alternatively be used as such. Each time a connection begins or ceases, the relative bars and moving members of the bridges are coupled for a short time to a shaft driven by the said motor. Such a use of a central source of moving energy for a number of members which are to be moved from time to time is known per se in automatic telephone technique and hence requires no further description. This system is found, for example, with the selectors in automatic telephone exchanges.

The invention will now be explained more fully by reference to the accompanying diagrammatic drawings showing in part, by way of example, two embodiments of a cross-bar switch according thereto.

Figure 1:
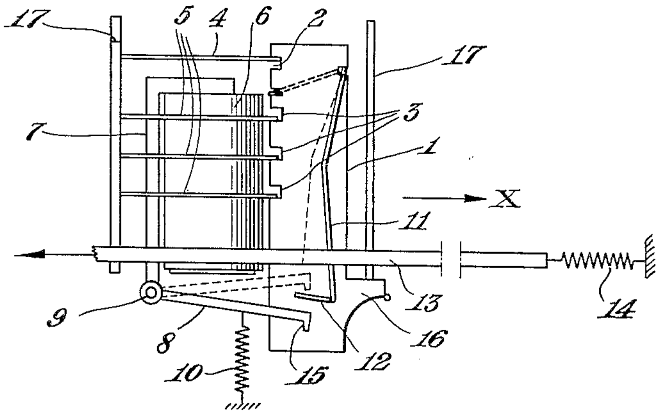
Figure 2:
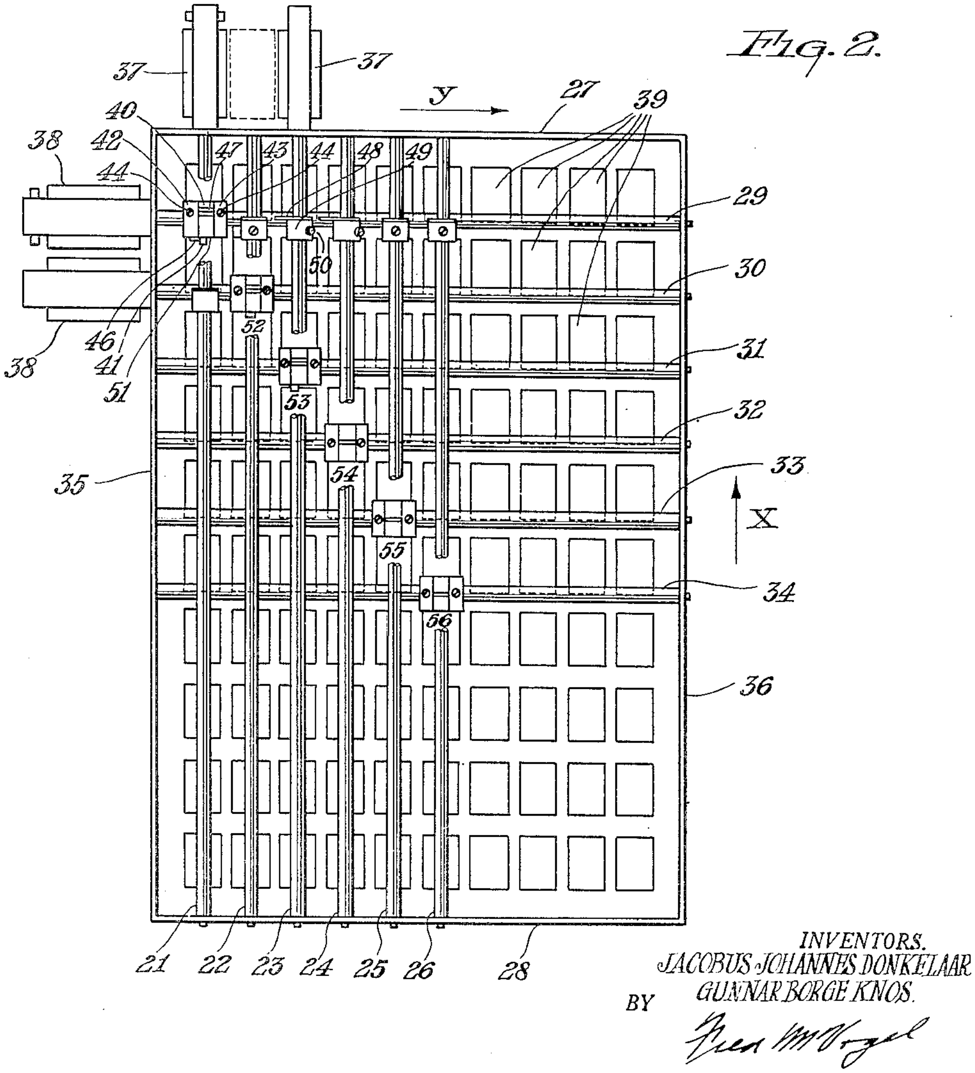

Fig. 1 shows a cross-bar switch of the kind constructed by the first-mentioned method and Figs. 2 and 3 show two projections of a cross-bar switch constructed by the second method.

Fig. 1 shows a bridge as viewed in direction Y. This figure shows only one catch, designated 1. Arranged after one another, that is to say in the direction of projection, are a number of such catches equal to the number of lines leading from the cross-bar switch farther into the telephone exchange. Arranged side by side (hence in direction X) are a number of catches equal to the number of lines coming from the subscribers. The catch shown has the shape of a flat strip of insulating material provided with notches 2 and 3. A catch of this shape is, as a rule, indicated by the name ladder. In the notch 2 lies the extremity of a spring 4, which provides the directional force and hence will be called directional spring. The notches 3 contain the extremities of springs 5, which constitute the movable contact bodies of the elementary switches and hence will be termed contact springs. The fixed contact bodies are not shown. They may exhibit the shape of parallel, straight wires extending in direction X. The directional spring 4 on the one hand and the contact springs 5 on the other exhibit tensions such as to exert opposite forces upon the catch. However, the directional force is stronger than the force of the contact springs, which provides the contact pressure.

Provided behind the catches is a bridge magnet 6, the yoke of which is indicated by 7. The movable armature of this magnet is integral with a moving member 8 of the bridge, which exhibits the shape of a plane plate one side of which exhibits recesses containing the catches 1 and the other side of which is pivoted at 9.

The armature is kept clear from the magnet by a helical spring 10, which provides the closing force and thus will be called closing spring. When the magnet is energized, the moving member 8 is turned about the shaft 9 against the tensile force of the closing spring 10, thus assuming its passive position. When, subsequently, the magnet is de-energized, the closing spring moves the moving member back into the position shown, that is into the active position.

A resilient needle 11, constituting the coupling member, is secured to the catch. The resilient needle 11 is bent at right angles at its free extremity, the bent portion being the coupling pin proper. The latter extends in direction Y, hence at right angles to the plane of the drawing and is passed through a slot 12 of the catch.

Along the catch is provided a bar 13, which is movable in its longitudinal direction, that is in direction X. The bar 13 may be pulled to the left by a bar magnet (not shown) and thus moved into its active position. When the bar magnet is de-energised, a spring 14 pulls the bar back into its passive position.

At the back, the bar 13 exhibits recesses in which the needles 11 are located. The walls of the recess containing the needle 11 are indicated by dotted lines.

When the bar magnet is energized, one wall of the recess contacts with the needle 11, the latter thus being catched by the bar and the coupling pin moving to the other extremity of the slot 12. If, now, the bridge magnet 6 has beforehand been energized, the coupling pin comes to lie below the moving member 8. For the establishment of a connection, the energising current of the bridge magnet requires to be switched-off whilst the bar magnet is still energized, the spring 10 thus drawing the coupling pin along with the moving member 8. Since, in the direction of movement of the moving member, the coupling pin cannot move with respect to the catch, the catch is also moved against the force of the directional spring 4, the contact springs 5 being enabled to engage the fixed contact bodies. The group of elementary switches is then closed. Consequently, the tension of the spring 10 is required to exceed that of the directional spring 4.

When, subsequently, the energising current of the bar magnet is interrupted, the bar 13 returns to its passive position, the coupling pin thus remaining pinched between the lower side of the movable member 8 and the lower wall of the slot 12. Furthermore, it is prevented from sliding off due to the hook-like edge 15 of the moving member. The connection is thus maintained and is not interrupted until the bridge magnet 6 is again energised. At this moment the magnet moves the moving member 8 into its (passive) position, shown in dotted lines. The directional spring 4 is thus enabled to move the catch from its active position into its passive position, the catch lifting the contact springs 5 from the fixed contact bodies and, with an abutment 16, engaging a fixed wall 17, which serves also to support the filiform fixed contact bodies and the contact springs of the adjacent group.

Since the stroke of the movable member 8 is larger than that of the catch, the edge 15 moves away from the coupling pin, whereupon it is drawn out of the path of the movable member due to the tensile force of the needle 11 and moved to the other extremity of the slot 12. The catch and the movable member are then again de-coupled. If, now, the bridge magnet 6 is again deenergized and the closing spring 10 pulls back the movable member 8, the catch does not follow the movement of the movable member, the various parts assuming the positions in which they are shown in Fig. 1.

Consequently, in this device the establishment of a connection requires a bridge magnet and a bar magnet to be energized one after another and, subsequently, the energising current for the bridge magnet to be switched-off, whereafter the bar magnet may also be deenergized.

Interruption of a connection requires the bridge magnet to be energized. It is desirable that this energisation is of only short duration in order to enable a new connection to be made.

The sequence of connections is different in the device shown in Figs. 2 and 3, in which the establishment of a connection only requires a bar magnet and a bridge magnet to be energized. The bridge magnet must not be de-energised before the bar magnet has been de-energized. It is desirable that this takes place immediately after the connection has been established in order to enable a connection to be made in another bridge in co-operation with another bar. For the interruption of a connection it is necessary that the bar magnet should be energized and sufficient that the energisation is of short duration.

In the cross-bar switch shown in Figs. 2 and 3, selecting bars are constituted by rotary shafts extending in direction X. The switch comprises ten selecting bars, six of which are shown in Fig. 2 and designated 21 to 26. In Fig. 3, which shows a side view seen from the left of Fig. 2 and in which the said selecting bars are located one after another and in which thus only one would be visible, a portion of each of the selecting bars shown in Fig. 2 is removed so that all six bars are visible in part. The selecting bars are rotatably supported in walls 27 and 28 of the casing or the frame of the switch.

The cross-bar switch comprises, in addition, ten operating bars which are constituted by rotary operating bars. Six such shafts are shown and designated 29 to 34. They extend in direction Y and are shown in cross-section in Fig. 3. The operating bars are rotatably supported in walls 35 and 36 of the casing or the frame of the switch.

Selecting bar magnets 37 serve to rotate the selecting bars and operating bar magnets 38 serve to rotate the operating bars. Adjacently disposed with respect to each intersection of the operating and selecting bars is a group of elementary switches, so that there are a hundred groups in all. Each of them is constituted, as is usually the case, by an assembly 39 comprising metal springs and intermediate strips of insulating material. Each spring exhibits a contact piece at one extremity and a soldering tag at the other extremity.

One catch is provided for each assembly. This catch comprises a ring 40, loosely provided on the operating bar, and a crank 41. When the crank 41 is urged against the associated spring assembly 39, the springs are bent and the group of elementary switches is closed. If the crank is clear from the spring assembly, the contact springs are relaxed and the switches open. The ring 40 is enclosed between two adjusting collars 42 and 43, which are secured in position to the operating bar by means of screws 44. Consequently, the ring is capable of rotating about the operating bar, but is incapable of sliding thereon. A plate spring 45 is implanted in the adjusting collar 42, the free extremity of the said spring being enclosed between two pins 46 projecting from the crank 41.

The ring 40 comprises a stop 47 on the side opposite the crank, which stop co-operates with a cam 48 secured to a ring 49. The rings 49 surround the selecting bars and are secured thereto by means of a screw 50, so that the cam 48 is forced to follow the movements of the selecting bar.

In order to make the operation of the bar switch in Figs. 2 and 3 better understood, the various positions that may occur will now be discussed. It is assumed that the magnets of the selecting bar 21 and of the operating bar 29 are not energized, in which event they occupy their passive positions. The catch 51 likewise occupies its passive position, which implies that its crank 41 does not contact with the spring assembly 39.

The magnet of the operating bar 30 is assumed to be energized, the latter thus occupying its active position. Nevertheless, the crank of catch 52 does not contact with its spring assembly, the magnet of the selecting bar 22 which co-operates therewith not being energized, so that the blocking member comprising the cam 48 checks the stop 47 of catch 52. This fact does not prevent the operating bar 30 from rotating, since the resilient connection 45 between the cam 41 and the operating bar 30 is adapted to curve and assumes, in the case of the catch 52, the curved position in which it is shown in Fig. 3.

The magnet of the selecting bar 23 is energized. This magnet has caused the bar, against the action of a spring (not shown), to be turned with respect to the previous bars to such extent that the cam 48, which co-operates with a catch 53, has left the path to be covered by the stop of this catch. However, since the magnet of the operating bar 31 carrying this catch is not energized, the crank of this catch neither contacts with its spring assembly.

The operating bar 32, due to its magnet being energized, has assumed its active position and, since the selecting bar 24 occupies a position similar to that in which the selecting bar 23 is shown, the operating bar 32, by means of a spring 45 (which, for this purpose, must exhibit sufficient rigidity) has been capable of moving a catch 54 and urging the crank 41 thereof against its spring assembly, the group of switches operated by the catch 54 thus being closed.

On the operating bar 33 is shown a catch 55 which, owing to energisation of the magnet of this shaft, was moved into its active position upon energisation of the magnet of selecting bar 25 with which it co-operates. However, the energisation of the selecting bar magnet has now ceased, the moment invariably exerted upon the selecting bars by an external spring force having moved the bar 25 back into its passive position.

Similar action takes place with the catch 56 provided on the operating bar 34 which co-operates with the selecting bar 26, but in this case not only the energising current for the selecting bar magnet but also that of the operating bar magnet is switched-off. The operating bar which is moved into its passive position by a spring (not shown) tends to pull the catch crank from the spring assembly by means of the coupling spring 45, but this is prevented due to the upper surface of the stop 47 engaging the blocking member, that is the cam 48 of the selecting bar. The group of elementary switches thus remains closed. This has not prevented the operating bar 34 from returning to its passive position since the spring 45 exhibits sufficient slackness to permit a relative movement of the moving member with respect to the catch. This spring, the free extremity of which is maintained in position by the pins 46, is curved by the action of the moment invariably exerted on the operating bars by an external spring force and moving the shaft 34 back into its passive position.

The group of switches operated by the catch 56 remains closed until the associated selecting bar magnet is energized, with the result that the cam 48 slides off the abutment 47 and is thus enabled to pass the latter. The spring 45 then again relaxes and moves the catch into its passive position. The springs of the elementary switches thus likewise relax and the communication is interrupted.

It must be avoided that two or more connections with an incoming or outgoing line may be made at one time. For this reason the switching device closing and interrupting the control currents of the magnets 37 and 38 must be realised in such manner that two or more selecting bar magnets are not energized simultaneously at a moment at which one of the operating bar magnets is energized and that two or more operating bar magnets are not energized simultaneously at a moment at which one of the selecting bar magnets is energized. Consequently, the position in which the switch is shown in Figs. 2 and 3 and in which two selecting bar magnets and three operating bar magnets are assumed to be energized does not actually occur. This switching device in itself does not form part of the invention and will not be further described since the known switching devices for operating cross-bar switches, as a rule, satisfy similar requirements.

The connections at the most may be established at one time with the cross-bar switch shown in Figs. 2 and 3. An increase of this number requires an increase in both the number of operating and selecting bars. An increase in number of only one of the said parts merely allows of a wider choice.

The moving magnets of the cross-bar switch shown in Figs. 2 and 3 may alternatively be substituted by selecting magnets by which the part to be moved is coupled for a short period to a central source of movement energy whenever a connection is to be established or interrupted. As an alternative, a device operating mechanically instead of electrically could ensure that two or more operating or selecting bars are not moved into their active positions at one time and in this event two or more selecting magnets of one kind are allowed to be energized simultaneously.

What we claim is:

1. A cross-bar switch for automatic telephony comprising a plurality of selecting bars disposed in parallel relation, a plurality of operating bars disposed in parallel relation transversely with respect to said selecting bars, electromagnetic means to actuate said selecting bars, electromagnetic means to actuate said operating bars, a switch having a moving contact disposed adjacent each intersection of said selecting and operating bars, a drive member coupled resiliently to said operating bar at said intersection and disposed in cooperative relation to the moving contact of said switch, and a stop member coupled to said selecting bar at said intersection and disposed in cooperative relation to said drive member, the stop member in the unactuated position of said selecting bar being disposed to block movement of the associated drive member, the stop member unblocking said drive member in the actuated position of said selecting bar to enable closing of said switch by said drive member when said operating bar is actuated.

2. A cross-bar switch, as set forth in claim 1, further characterized by resilient connecting means coupling the operating bar at said intersection to said drive member, said means having a degree of flexure permitting actuation of said operating bar despite blocking of said drive member by said stop member, said means exhibiting a degree of rigidity sufficient to have the drive member, when unblocked, follow the operative movement of the operating bar and thereby actuate said switch.

3. An arrangement, as set forth in claim 1, wherein said operating and selecting bars are rotatable and said electromagnetic means for said bars impart angular movement thereto.

4. A cross-bar switch for automatic telephony comprising a plurality of rotatable selecting bars disposed in parallel relation, a plurality of rotatable operating bars disposed in parallel relation transversely with respect to said selecting bars, separate electromagnetic means for rotating said selecting bars and said operating bars, a switch having a moving contact disposed adjacent each intersection of said selecting and operating bars, a drive member resiliently coupled for angular motion to said operating bar at said intersection, said drive member being provided with a crank in cooperative relation with said moving contact and an abutment, a stop member coupled to said selecting bar and having a cam disposed in cooperative relation with said abutment, said cam being disposed to engage said abutment in the unactuated position of said selecting bar to block movement of said drive-member, said cam being disengaged from said abutment in the operative position of said selecting bar.

JACOBUS JOHANNES DONKELAAR.
GUNNAR BÖRGE KNÖS.

REFERENCES CITED

The following references are of record in the file of this patent:

UNITED STATES PATENTS

| Number | Name | Date |
|---|---|---|
| 2,187,577 | Stockfleth | Jan. 16, 1940 |
| 2,238,458 | Waller | Apr. 15, 1941 |
| 2,479,678 | Graybill et al. | Aug. 23, 1949 |